Feb. 22, 1949.   O. E. ESVAL   2,462,081
SERVOMOTOR SYSTEM

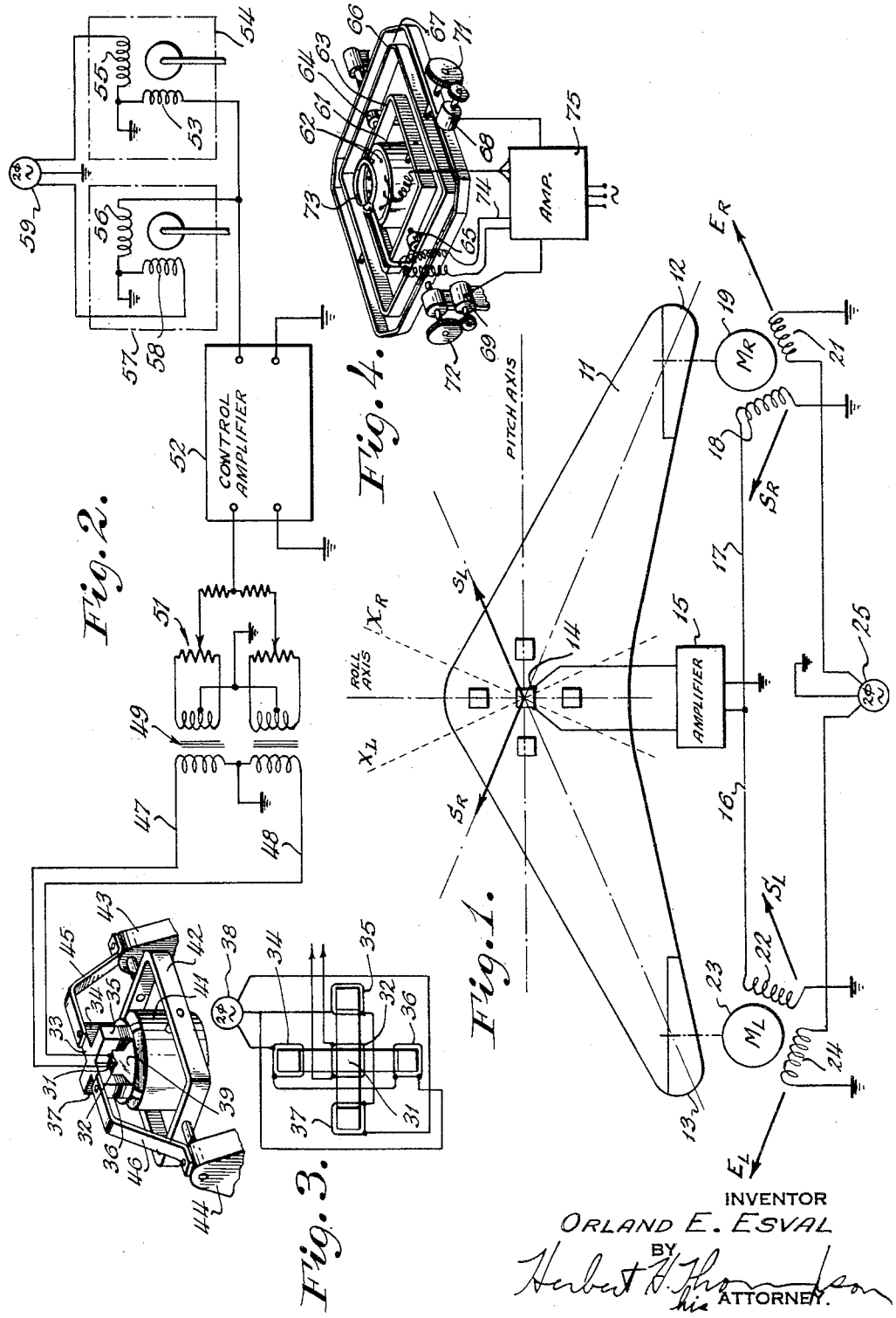

Filed Aug. 22, 1947   2 Sheets-Sheet 2

INVENTOR.
ORLAND E. ESVAL
BY
Herbert H. Thompson
his ATTORNEY.

Patented Feb. 22, 1949

2,462,081

UNITED STATES PATENT OFFICE 2,462,081

SERVOMOTOR SYSTEM

Orland E. Esval, Huntington, N. Y., assignor to The Sperry Corporation, a corporation of Delaware Application August 22, 1947, Serial No. 770,081

26 Claims. (Cl. 318—19)

This invention relates to servo systems in general, and particularly concerns a novel system whereby two servomotors may be individually controlled in response to a signal which in turn may reflect either of several variables or combinations thereof.

More particularly, and in accordance with this invention, a signal source or generator is provided having an output voltage with a magnitude dependent on or proportional to the extent of deviation about an axis, the output voltage further having a time phase relation dependent upon the particular axis about which the deviation occurred. Also provided are two servomotors arranged to receive or be controlled by the aforementioned signal or voltage in an arrangement whereby only one motor will operate, if the deviation occurred about a particular axis, and only the other motor will operate if the deviation occurred about a second axis bearing a predetermined angular relation to the first axis. Further, should a deviation occur about any third axis different than the particular axes mentioned, both servomotors are arranged to proportionately operate in accordance with the angular relation that the third axis bears to the other predetermined axes.

Therefore, a primary object of the instant invention is to provide a servomotor system for individually and selectively operating two servomotors, respectively in accordance with each of two independent variables, or combinations thereof, to which the system is responsive.

A further object is to provide a servo system for operating two servomotors in response to the output of a signal source or generator which in turn may be arranged to respond to both of two variables, or to produce an output having components respectively proportional to said two variables.

Another object is to provide a novel signal source particularly for use in a servomotor system having two motors, in which said signal source provides a single signal that constitutes a measure of two independent variables, each motor being controlled in accordance with separate ones of said variables.

Still another object is to provide a novel servo system for individually or jointly operating two servomotors in accordance with the two variables with but a single signal voltage being transmitted from the signal source to both of the servomotors.

A further object is to provide means for producing a signal that is responsive to two variables that are respectively dependent upon motion relative to two axes, and having a single amplifier for the signal, together with means for segregating those components of the signal which respectively are measures of the two variables, whereby two seperate control signals result from a single pick-off and amplifier system.

A further object is to provide a novel servo system in which the signal source has a single signal voltage output having a magnitude responsive to the extent of deviation about any axis and a time phase relation that is responsive to the direction of that deviation.

Still another object is to provide means for producing a signal that is responsive to two variables that are respectively dependent upon motion relative to two axes and having a single amplifier for the signal, and in which the output of the amplifier is fed through one phase, each of two two-phase servomotors, the controlled phases of which are connected in parallel circuit to the amplifier output.

Other objects and advantages will become apparent from the specification, taken in connection with the accompanying drawings wherein the invention is embodied in concrete form.

In the drawings,

Fig. 1 illustrates an embodiment of the invention as applied to a flying wing type aircraft.

Fig. 2 illustrates an alternative embodiment of the instant invention.

Fig. 3 is a diagram illustrative of a detail of a component of the signal source of Figs. 1 and 2.

Fig. 4 is a perspective drawing of an embodiment employing an alternative signal source.

Figure 6:
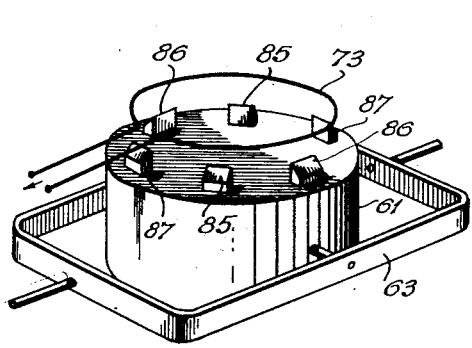
Figs. 5, 6, 7 and 8 illustrate details of alternative pickoffs.

In order to illustrate the most general application of the instant invention, the adaption of the invention to a flying wing type of aircraft is first illustrated. However, as the adaption set forth herein only deals with those features of the flying wing type of craft that are necessarily disclosed to afford an understanding of the application of the instant invention thereto, a more complete understanding of the problems involved in providing a wing type craft with an automatic pilot may be had by reference to U. S. Patent No. 2,417,821 issued on March 25, 1947, to Harcum and Halpert and entitled "Automatic pilot for dirigible craft."

Referring now to Fig. 1, an aircraft of the flying wing 11 is illustrated as having a right elevon 12 for producing craft control moments about the $X_R$ axis, and a left elevon 13 for producing craft control moments about the $X_L$ axis, both the $X_L$ and $X_R$ axes intersecting at the center of gravity of the craft 11. Craft motion about the roll axis, or about the pitch axis, or about both of these axes, may be produced by displacing the elevons 12 and 13 in an amount and direction dependent upon the sort of craft motion desired. In any event, and for the purpose of illustrating the instant invention, craft motion about any axis may be considered as involving combinations of motion about $X_R$ and $X_L$ axes. Further, motion about $X_R$ and $X_L$ axes may be considered as having been caused by displacement of the right elevon 12 or the left elevon 13, respectively.

A signal generating means 14 in this instance is located near the craft center of gravity (though it may be located in any other suitable position) and is in the form of a pickoff device associated with a vertical reference. The pickoff device will be later described more fully. Upon deviation of the craft from flight in a horizontal plane, the signal generating means 14 is arranged to provide a signal voltage output. Further, the signal voltage output provided by the signal generator means 14 will be time-phased in accordance with the direction of the deviation. In other words, in the event the craft deviates from horizontal flight by entering into a pitch motion, the signal generating means 14 will be displaced relative to the vertical reference and this particular deviation may be considered as being productive of a signal voltage having a vector normal to the axial direction of the deviation. Thusly, if the craft movement involves rotation about the $X_R$ axis the signal voltage output may be considered as being time-phased, as compared to the phase of the signal voltage produced by craft motion in pitch, in the direction indicated by the vector $S_R$. Similarly, craft motion involving rotation about the $X_L$ will cause a signal voltage to be produced, which may be considered as having a time-phase corresponding to the vector $S_L$. Craft motion involving rotation about any intermediate axis may be considered as occasioning a signal voltage having a time-phase dependent upon the direction of that motion.

An amplifier 15, arranged to receive the output from the signal generating means 14, serves to amplify that output without distorting the phase relation of the voltages that may be applied thereto. As such amplifiers are well known to the art, a further description herein is not provided. The amplified signal voltage is then transmitted by lines 16 and 17 to supply that voltage in parallel circuit to one winding 18 of the servomotor 19 and to one winding 22 of the servomotor 23. In this instance, servomotors 19 and 23 are of the two-phase type each having two field windings. Normally, one winding of each servomotor will receive the signal voltage and the other winding of each will receive an energizing voltage. Further, in this embodiment, energizing voltages from a two-phase alternating current source 25 are arranged to excite one winding of each servomotor. Thusly, servomotor 19 has winding 21 energized by one phase of the two-phase source and winding 24 of servomotor 23 is energized by the other phase of the two-phase energizing source 25. Inasmuch as it is desired to operate only one motor on the occurrence of a signal that is responsive to, for example, rotation about the $X_R$ axis, it is necessary that the energizing voltages that are supplied to the excited windings of servomotors 19 and 23 bear certain phase relationships to each other. Thusly, as it was assumed that the signal emanating from the signal source 14 will have a time phase such as indicated by the vector $S_R$, and as it is desired to operate servomotor 19 to the exclusion of servomotor 23, one servomotor winding must be energized by a voltage having a time phase in phase or 180° out of phase with that signal voltage vector. More particularly the servomotor 23 is energized by a voltage $E_L$ having a time phase in phase or 180° out of phase with the phase of the signal $S_R$. Upon the occurrence of the signal voltage represented by the vector $S_R$, the servomotor 23 will have an energized winding in phase (or 180° out of phase) with the signal voltage winding and therefore will not operate.

Referring now to the servomotor 19, the one field winding 18 of the servomotor is also arranged to receive the amplified signal voltage having a vector as indicated by $S_R$. However, the excited winding of the servomotor 19 is energized by a voltage having a vector in approximate quadrature relation to the phase of the signal voltage $S_R$. Specifically, the winding 21 of the servomotor 19 is energized from the two phase alternating current source 25 by a voltage $E_R$ that is in phase or 180° out of phase with the signal voltage $S_L$ that would normally be created by a rotation of the craft 11 about the $X_L$ axis. This signal voltage vector $S_L$ being in phase or 180° out of phase with the energizing voltage vector $E_R$ will, upon its occurrence, fail to operate the servomotor 19. However, the signal voltage represented by the vector $S_L$ will upon occurrence, operate the servomotor 23 inasmuch as it has an approximate quadrature phase relation to the exciting voltage $E_L$. It can be readily seen that by correct phasing of the field windings of each of the servomotors 19 and 23, they may be made to operate in a direction that will cause the ailerons 12 and 13 respectively to be displaced in a sense to eliminate a signal $S_R$ or $S_L$ which would occur upon rotation of a craft about either the $X_R$ or the $X_L$ axis respectively. Furthermore, if craft motion in pitch is desired, the servomotors 19 and 23 may be operated sympathetically whereas if the craft motion in roll is desirable, the servomotors 19 and 23 may be operated antagonistically. Any combinations of the craft roll and pitch may be obtained by appropriately proportioning signals to these servomotors.

The device illustrated in Fig. 2 sets forth a more limited application of the instant invention but nevertheless one in which the efficiency of operation is peculiarly increased. In the apparatus in Figs. 2 and 3, the axis about which displacements primarily occur are in quadrature relation to each other. A pick-off coil 31 mounted on the center leg 32 of a double-E or + core 33 is arranged with a two phase exciting source 38 in a manner to create an output voltage in the coil 32. Specifically, the two phase source 38 has one phase connected to coils 34 and 36 located on opposing legs of the double-E pick-off 33, whereas the other phase of the two-phase voltage 38 is connected to energize coils 35 and 37 located on the other two legs of the double-E pick-off 33. Armature 39 which, in this instance, is illustrated as being of a circular or dished configuration but which may assume any of well-known shapes, is disposed immediately underneath the inverted E pick-off 33 so as to effect changes in coupling between the outer legs and the center coil, thereby creating a signal in the center coil which signal will have a time phase dependent upon the direction of deviation of the core 39 with respect to the double-E pick-off 33, and will experience a phase reversal when the direction of deviation of said core from a zero signal position occurs. Further, as the armature 39 is mounted on a vertical reference which, in this case is illustrated as being a vertical gyro 41, the stator 39 will remain stationary whereas the pick-off coil 32 will move thereby creating a signal voltage responsive in its time phase to the direction of displacement of the gyro relative to the E pick-off 33.

The vertical gyro 41 is mounted in an outer gimbal 42 which in turn is pivotally mounted in the supports 43 and 44 which may be affixed to a craft or other body. The E pick-off 33 is rigidly affixed to the craft by means of the supporting members 45 and 46. Thus, by the occurrence of a deviation from the vertical by the member upon which the supports 43 and 44 may be mounted, a signal will be created in the coil 32, and this signal will be transmitted by the lines 47 and 48 to input transformers 49, thence through the voltage divider identified generally at 51 and amplified in the control amplifier 52. As in the case of the amplifier illustrated at 15 in Fig. 1, the instant control amplifier 52 may be any of many well known types that are free of phase shift change. The output from the control amplifier 52, which is the amplified signal voltage, is then applied in parallel circuit to the winding 53 and of the servomotor 54, and the winding 56 of the servomotor 57. As servomotors 54 and 57 are of the two-phase type, each having two field windings, the other winding of each servomotor 55 and 58 are respectively energized by one phase of a two phase alternating current source 59. In this instance, the two phase alternating current source may produce voltages that are phased in quadrature relation to each other. Thusly, upon deviation of the armature 39 along a line identified, for example, by the axis connecting the E pick-off legs 35 and 37, a control signal voltage will be created in the coil 32, which voltage, when amplified, will serve to operate only one of the servomotors 54 or 57. If the armature 39 is displaced along a line defined, for example, by the axis connecting the legs 34 and 36 of the E pick-off 33, only the other servomotor will operate. In the event that the armature 39 is displaced along any other axis, both servomotors 54 and 57 will operate in proportion to the angular relation which the new axis bears to the quadrature related axis.

Figure 5:
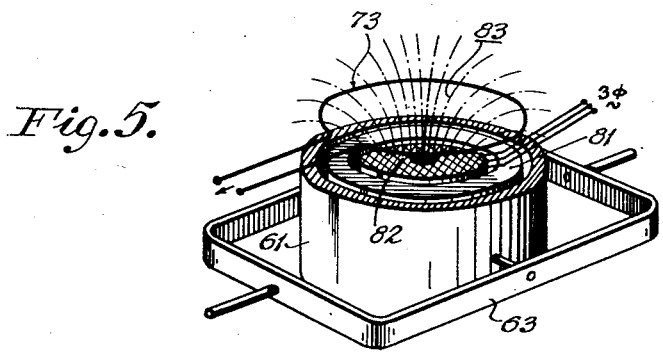

An alternative embodiment of the instant invention is illustrated in Fig. 4, wherein one form of an alternative pick-off is utilized. More particularly, the vertical gyro 61 incorporates a rotating magnetic field 62. The rotating magnetic field is, in this instance, created by the currents that energize the rotor to rotate same. Thus, in Fig. 5, the gyro 61 would normally be provided with a rotor 81 mounted to be rotated inside the gyro 61 by the polyphase rotor field 82. The polyphase field 82 will be productive of a rotating magnetic field generally identified as 83, which field normally would extend to a region external to the casing of the gyro 61. The wire loop 73, by virtue of being positioned within this rotating field 83, will have induced therein, a voltage having a magnitude dependent upon the extent of deviation of the coil or loop 73 from a central position within the field 83, and having a time-phase dependent upon the direction of that deviation. The gyro 61 is mounted in the gimbal 63 which in turn is pivotally mounted in the brackets 64 and 65. The brackets 64 and 65 may be mounted on a body such as a craft or a ship or missile. Surrounding the gimbal member 63 is a second gimbal 66 which in turn is pivotally mounted in a third gimbal member 67. Located on the outer or third gimbal member 67 are two servomotors 68 and 69 which are operatively associated with gear mechanisms 71 and 72 and which are respectively arranged to rotate gimbals 66 and 67 in accordance with the rotation of the servomotors 68 and 69. Mounted on the gimbal member 66 is a loop of wire 73 arranged to be located immediately above and in the rotating magnetic field 62. In this manner deviations of the two outer gimbal members 66 and 67 with relation to the vertical gyro 61 will be productive of a signal voltage in the coil 73, this signal voltage having a time phase dependent upon a direction of that deviation and a magnitude dependent upon the extent of deviation. This signal voltage emanating from the coil 73 is transmitted along the lines 74 and amplified in the amplifier 75 whereupon the amplified signal voltage is transmitted to the servomotors 68 and 69 in parallel circuit and in the same manner as more fully described with relation to the servomotors of Fig. 2. In this particular embodiment the prime function of the servomotor mechanism and the signal pick-off is that of a follow-up mechanism wherein the outer gimbal 66 and 67 are constantly maintained in alignment with the vertical gyro 61.

It is to be understood that the energizing voltages for the fixed phases of the motors bear a fixed phase relation to the two phase exciting voltages for the pick-off or signal generator so that either motor will operate when a signal component in quadrature phase relation to its fixed field is received, but will not operate in response to the other of the two signals, while both motors may operate simultaneously depending upon the presence of signal components to which each is responsive.

Figure 7:
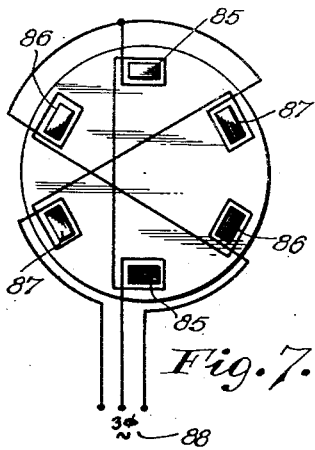

For certain applications and in the event that a stronger signal is required from the pick-off loop than is obtainable by the method of utilizing the rotating field created by the rotor windings as hereinbefore described, the gyro 61 may be provided with an external rotating electrical field in the form illustrated in Figs. 6 and 7. Therein the gyro 61, pivotally mounted in the gimbal 63, is provided with three pairs of pole pieces, 85—85, 86—86, and 87—87. These pole pieces are equally spaced on the outer casing gyro 61, and the loop 73 is mounted directly over them, so as to be in the immediate region of the field to be created by the pole pieces when energized. Each pair of pole pieces 85, 86 and 87 are wound with an energizing winding, each pair being wound in opposition, and each pair being connected to receive one phase of the three phase alternating voltage 88. The three phase alternating voltage source 88 will provide the gyro with a rotating magnetic field which will induce, in the loop 73, a voltage having a time phase dependent upon the direction of deviation of the loop from a central position relative to the pole pieces 85, 86, and 87, and further having a magnitude dependent upon the extent of that displacement.

Figure 8:
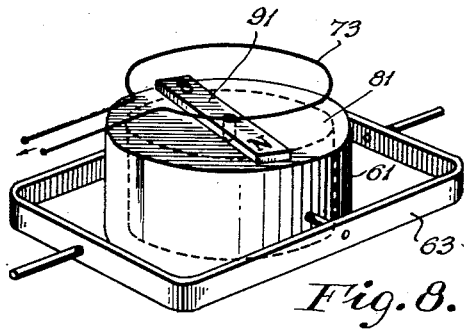

As earlier stated herein, a time-phased voltage will be induced in the loop 73, whenever it is placed in the region of a rotating magnetic field. A further acceptable method of providing the necessary rotating magnetic field is illustrated in Fig. 8, wherein a two pole magnet 91, is mounted on the gyro 61, in a manner whereby the magnet is made to rotate with the gyro rotor. The speed of rotation of the magnet 91 may be equal to that of the gyro rotor, or may be altered by suitable gearing mechanisms.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a servo system for selectively operating each of a pair of two phase servomotors respectively in response to two variables, means for producing a signal voltage having a predetermined and different time phase for each of said variables, amplifying means for said signal voltage, means connecting one phase of each servomotor in parallel and with the amplified signal voltage, and means for energizing the other phases of the two servomotors each with a voltage having a phase relation to the other corresponding to the phase relation sense of the components of the signal voltage produced by said signal voltage producing means as measures of said variables.

2. In a servo system for selectively operating a pair of servomotors in response to two variables, said servomotors each having two field windings, means for producing a signal voltage having a predetermined time phase for each of said variables and having a magnitude responsive to the magnitude of each of said variables, amplifying means for said voltage, means connecting said amplified voltage in parallel circuit with one field winding of each servomotor, and energizing means for the other field winding of each servomotor, said energizing means comprising two phase displaced voltages respectively arranged to be in phase unison with the time phase of the voltage occasioned by the occurrence of one of said variables and in approximate quadrature phase relation to the time phase occasioned by the other of said variables.

3. In a servo system for selectively operating a pair of two phase servomotors in response to two variables, said variables being occasioned by displacements occurring about two quadraturely related axes, means for producing a signal voltage having a time phase dependent upon the particular axes about which a deviation occurs, amplifying means for said voltage, means connecting said amplified voltage in parallel circuit with one phase of each servomotor, and energizing means for the other phase of each servomotor comprising two quadraturely phase displaced voltages.

4. A servo motor system comprising, a reference device, two part signal producing means having one part associated with the device and the other part displaceable relative to said device, said means producing a signal voltage having a time phase dependent upon the direction of displacement, amplifying means for said signal voltage, a pair of servomotors each having two field windings, one winding of each being connected together in parallel and to receive the amplified signal voltage, and means for exciting the other winding of each servomotor with out-of-phase currents.

5. A servomotor system comprising, a reference device, signal producing means having a signal voltage output with one time phase dependent upon movement relative to said device with respect to a first predetermined axis, and with a second time phase dependent upon movement relative to said device with respect to a second predetermined axis, amplifying means for said signal voltage, a pair of servomotors each having two field windings and arranged to receive said amplified voltage in parallel circuit with one winding of each servomotor, and means for exciting the other winding of each servomotor, said means including one voltage in phase unison with the phase sense of the signal voltage created by a displacement about said first predetermined axis, and one voltage in approximate quadrature phase relation with the phase sense of the signal voltage created by a displacement about said second predetermined axis.

6. A servomotor system comprising, a reference device, voltage generating means for producing an output voltage having a time phase dependent upon the direction of a displacement relative to said device, amplifying means for said voltage, a pair of servomotors each having two field windings and arranged to receive said amplified voltage in parallel circuit with one winding of each servomotor, and means for exciting the other winding of each servomotor, said means including one voltage in phase unison with the phase sense of the signal voltage created by a displacement about one predetermined axis, and one voltage in approximate quadrature phase relation with the phase sense of the signal voltage created by a displacement about a second predetermined axis.

7. A servomotor system comprising, a reference device, two part signal producing means having one part secured to said device and the other part displaceable relative thereto, said means producing a signal voltage having a time phase dependent upon the direction of displacement, amplifying means for said voltage, a pair of two phase servomotors, circuit means connecting said amplified voltage in parallel circuit with one phase of each servomotor, energizing means for the other phase of each servomotor including two voltages phase displaced relative to each other so that one energizing voltage is in phase unison with the phase of the signal voltage caused by displacement about one predetermined axis, and the other energizing voltage is in approximate phase quadrature with respect to the phase of the signal voltage created by a displacement about a second predetermined axis.

8. A servomotor system for operating a pair of servomotors in response to two independent variables, said variables being respectively occasioned by relative movement about each of two oblique axes, said system comprising pick-off means having a signal voltage output comprising a voltage having a time phase dependent upon the direction of movement relative to said axes, amplifying means for said signal voltage, a pair of two phase servomotors arranged to receive said amplified control signal in parallel circuit on one phase of each of said servomotors, and means including two voltages having a phase displacement equal to the angular relation between said oblique axes for respectively energizing the other phase of each of said servomotors.

9. A servomotor system for operating a pair of servomotors in response to two independent variables, said variables being respectively occasioned by relative movement about each of two oblique axes, said system comprising pick-off means including a double E-type armature having a signal producing coil on the center leg of said armature and further having opposing outer legs, respectively energized by each of two phase displaced voltages, said pick-off having a voltage output with a time phase dependent upon said variables, amplifying means for said signal voltage, a pair of two phase servomotors arranged to receive said amplified control signal in parallel circuit on one phase of each of said servomotors, and means including two voltages respectively phase displaced to be in accordance with the time phase of the signal voltage occasioned by motion relative to each of said axis for energizing the other phase of each of said servomotors.

10. In a servomotor system having a pair of two-phase servomotors, a two-phase power supply for energizing one phase of each servomotor, a pair of signal voltages phase displaced 90° with respect to each other, amplifying means for said pair of signal voltages, and circuit means connecting said amplified signal voltages in parallel circuit to each of the other phases of said servomotors.

11. In a servomotor system for operating each of a pair of two-phase servomotors respectively in response to two variables, a two-phase power supply for energizing one phase of each servomotor, means for producing signal voltage having a time phase dependent upon each of the variables, amplifying means for said signal voltage, and circuit means connecting said amplified signal voltage in parallel circuit with each of the other phases of said servomotors.

12. In a servomotor system, means including a two part pick-off for producing a time phased signal voltage having an amplitude dependent upon the extent of displacement of one part of said two part pick-off relative to said other part, amplifying means for said signal voltage, a pair of servomotors each having a pair of field windings arranged in quadrature relation, said amplified signal voltage being applied in parallel circuit to one winding of each of said servomotors, and a two-phase power supply arranged to provide each winding of said servomotor with one phase excitation therefrom.

13. The combination of means for producing a time-phase signal voltage, amplifying means for said signal voltage, a pair of servomotors each having a two-phase field winding, means applying said amplified signal voltage in parallel circuit to one phase of each of said field windings, and a two-phase power supply for exciting the other said field windings in quadrature phase relation.

14. In a servomotor system, means including a two axis reference pick-off for producing a time phased signal voltage output having an amplitude dependent upon the extent of displacement of said pick-off relative to each of said reference axes, amplifying means for said signal voltage, a pair of two-phase servomotors, two 90° phase displaced power sources, one winding of each motor being connected to receive one phase of said power source and said amplified signal voltage being applied in parallel circuit to the other phase of each of said servomotors.

15. In a servomotor system, a pair of two-phase servomotors having a two phase power source for respectively energizing one winding of one servomotor in quadrature relation with one winding of the other servomotor, a control signal source having a time-phased voltage output, amplifying means for said control signal, and means connecting said amplified control signal in parallel circuit to the other windings of said servomotors whereby control of each servomotor is affected in response to the time phase of the signal voltage.

16. In an aircraft of the flying wing type having a pair of control surfaces for producing control moments about each of two oblique axes, a vertical reference device, pick-off means associated therewith having a signal voltage output comprising a voltage having a time phase responsive to the direction of pick-off displacement relative to said vertical reference, an amplifier for said signal voltage, a pair of two-phase servomotors connected to receive said signal voltage in parallel circuit on one phase of each servomotor, and energizing means for the other phase of each servomotor, said energizing means including a source of two phase voltage supply having a phase displacement equal to the angular displacement of said oblique axes.

17. In an aircraft of the flying wing type having a pair of control surfaces for producing control moments about each of two oblique axes, a vertical reference means, pick-off means associated with said reference means having a signal voltage output comprising a voltage having a time-phase dependent upon the angular direction of deviations relative to said oblique axes, an amplifier for said signal voltage, a pair of two-phase servomotors arranged to receive said amplified signal voltage in parallel circuit on one phase of each servomotor, and energizing means for the other phase of each servomotor, said energizing means including a pair of voltages phase displaced in an amount equivalent to the time phase of said signal voltage as occasioned by deviations about said oblique axes.

18. In an aircraft of the flying wing type having a pair of oblique axes about which control moments are normally applied, a vertical reference comprising a vertical gyro, signal generating means for said reference including a rotating magnetic field and a single loop pick-off arranged in said magnetic field to produce a signal voltage having a time phase dependent upon the direction of deviation relative to each of said oblique axes, an amplifier for said signal voltage, a pair of two phase servomotors connected to receive said amplified signal voltage in parallel circuit on one phase of each servomotor, and a two phase voltage source for energizing the other phase of each of said servomotors, the phase displacement of the individual components of said energizing source being substantially equal to the angular displacement between said oblique axes.

19. In an aircraft of the flying wing type having a pair of oblique axes about which control moments are normally applied, a vertical reference, signal generating means including a polyphase field and a single loop stator arranged therewith to produce a signal having a time phase dependent upon the direction of deviation, amplifying means for said signal, a pair of two phase servomotors connected to receive said amplified signal in parallel circuit on one phase of each servomotor, and a two phase voltage source for respectively energizing the other phase of each servomotor, the phase displacement of the individual components of said energizing source being substantially equal to the angular displacement between said oblique axes.

20. A signal generating device for producing a signal voltage output having a time phase and magnitude dependent upon direction and extent of displacement between two relatively displaceable parts comprising, a magnet rotatably mounted on one of the parts and positioned thereby, and means including a wire loop positioned by the other part in the effective region of the field created by said magnet.

21. A signal generating device for producing a signal voltage output having a time phase and magnitude dependent upon direction and extent of displacement between two relatively displaceable parts comprising, means productive of a rotating magnetic field and including a plurality of pole pieces and a polyphase voltage for energizing same, said means displaceable in accordance with displacement of one of said parts, and a wire loop positioned by the other part in the effective region of said magnetic field.

22. A signal generating device for producing a signal voltage output having a time phase and magnitude dependent upon direction and extent of displacement between two relatively displaceable parts comprising, a rotating magnetic field displaceable in accordance with displacement of one of said parts, and a wire loop positioned by the other part in the effective region of said magnetic field.

23. A pickoff, for producing a signal voltage output having a time phase and magnitude dependent upon direction and extent of displacement between two relatively displaceable parts comprising, a rotating magnetic field positionable by one of said parts, said field including a plurality of pole pieces having a polyphase excitation source, and a wire loop in the effective region of said field and positioned by the other of said parts, whereby upon relative movement between said field and said loop a voltage will be induced in said loop proportional to said movement.

24. A signal generating device for producing a signal voltage output having a time phase and magnitude dependent upon direction and extent of displacement between two relatively displaceable parts comprising, means productive of a rotating magnetic field positioned by one of said parts, a wire loop in the effective region of said magnetic field, and means positioned by the other of said parts for effectively varying the voltage induced in said coil in accordance with displacement of said other part.

25. A signal generating device for producing a signal voltage ouput having a time phase and magnitude dependent upon direction and extent of displacement between two relatively displaceable parts comprising, a double E type core having four outer legs and an inner leg, said core being mounted on a first of said parts, a two-phase voltage source for energizing the outer legs of said core, a wire loop on the inner leg of said core, and coupling means mounted on the other of said parts for varying the voltage induced in said wire loop in accordance with displacement of said other part relative to said first part.

26. The combination of means for producing a time phase signal voltage, a pair of servomotors each having a two-phase field winding, means applying said signal voltage in parallel circuit to one phase of each of said field windings, and a two-phase power supply for exciting the other of said field windings in quadrature phase relation.

ORLAND E. ESVAL.

No references cited.